US00RE50390E

(19) United States
(12) Reissued Patent
Ehrenberg et al.

(10) Patent Number: US RE50,390 E
(45) Date of Reissued Patent: Apr. 22, 2025

(54) KEYBOARD

(71) Applicant: Logitech Europe S.A., Lausanne (CH)

(72) Inventors: Benjamin Ehrenberg, Aschaffenburg (DE); Irfan Shabbir Kachwalla, Taipei (TW); Sandipan Bhuyan, Honk Kong (HK); Nicholas Jinkinson, St-Sulpice (CH)

(73) Assignee: Logitech Europe S.A., Lausanne (CH)

(21) Appl. No.: 29/938,350

(22) Filed: Apr. 19, 2024

Related U.S. Patent Documents

Reissue of:
(64) Patent No.: Des. 976,260
Issued: Jan. 24, 2023
Appl. No.: 29/773,433
Filed: Mar. 9, 2021

(51) LOC (15) Cl. ..... 14-03
(52) U.S. Cl.
USPC ..... D14/392
(58) Field of Classification Search
USPC ..... D14/331, 390, 391, 392, 455
CPC ..... B41J 5/107; B41J 5/10; B41J 5/12; B41J 5/14; B41J 7/34; G06F 3/0219; G06F 3/0231; G06F 3/0202; G06F 3/0213; G06F 3/03546; G06F 3/0359; G06F 3/0205; G06F 3/02
See application file for complete search history.

(56) References Cited

U.S. PATENT DOCUMENTS

D490,077 S * 5/2004 Lance ..... D14/396
D567,240 S * 4/2008 Griffin ..... D14/392
D574,825 S * 8/2008 Baker ..... D14/392
D599,349 S * 9/2009 Meyer ..... D14/391
D653,665 S * 2/2012 Maruyama ..... D14/392
D768,632 S * 10/2016 Rüegg ..... D14/392
D786,249 S * 5/2017 Feiz ..... D14/392
D789,941 S * 6/2017 Sauvage ..... D14/455
D880,488 S * 4/2020 Akana ..... D14/455
(Continued)

FOREIGN PATENT DOCUMENTS

CN 307470411 * 4/2022
CN 307337976 * 5/2022
(Continued)

OTHER PUBLICATIONS

Youtube video of 308i Ajazz keyboard, Oct. 13, 2021, https://www.youtube.com/watch?app=desktop&v=vk3kQ8M6W1I.*
(Continued)

*Primary Examiner* — Philip S Hyder
(74) *Attorney, Agent, or Firm* — Kilpatrick Townsend & Stockton LLP

(57) CLAIM

The ornamental design for keyboard, as shown and described.

DESCRIPTION

FIG. 1 shows a top, front perspective view of a keyboard showing our new design;
FIG. 2 shows top, rear perspective view thereof;
FIG. 3 shows a top plan view thereof;
FIG. 4 shows a bottom plan view thereof;
FIG. 5 shows a front elevation view thereof;
FIG. 6 shows a rear elevation view thereof;
FIG. 7 shows a left side elevation view thereof; and,
FIG. 8 shows a right side elevation view thereof.
The broken lines depict portions of the keyboard in which the design is embodied that form no part of the claimed design.

1 Claim, 5 Drawing Sheets

Figure 4:
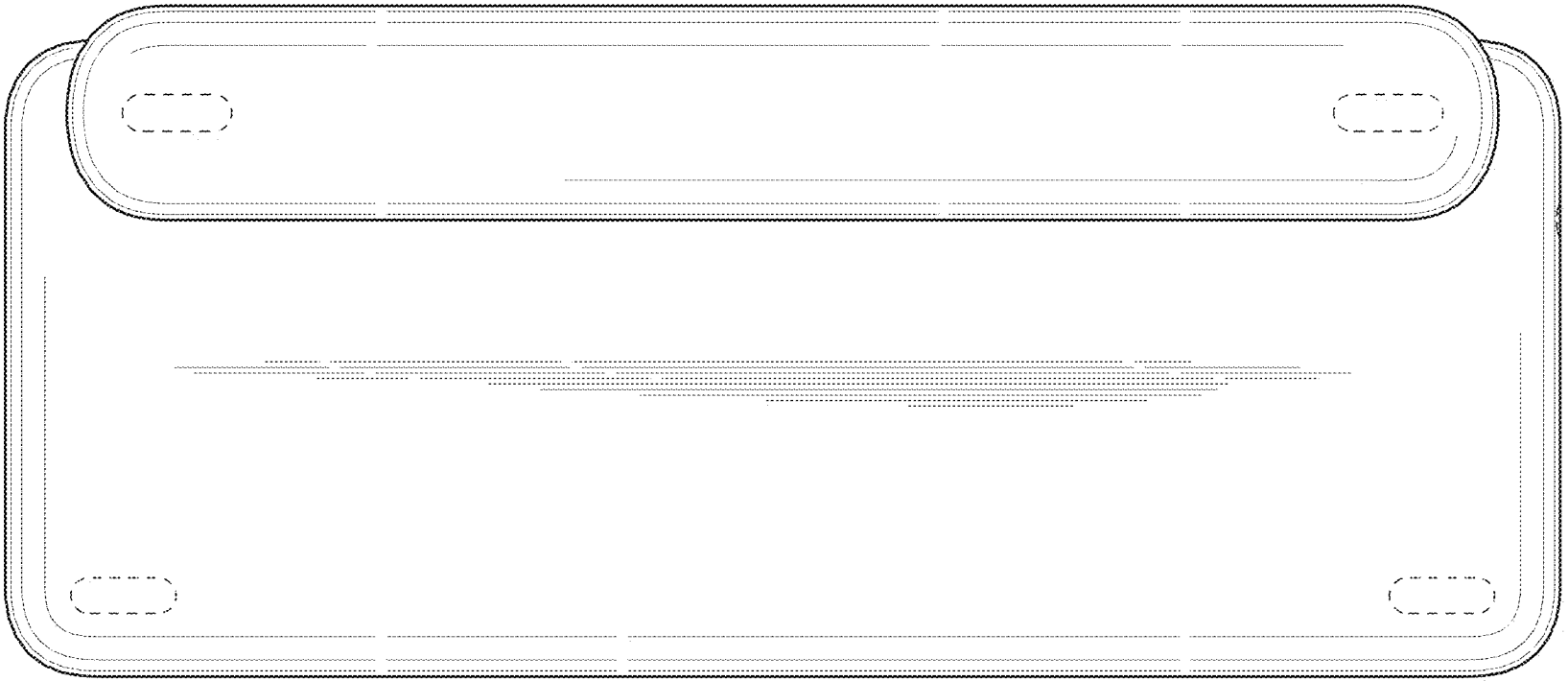

Matter enclosed in heavy brackets [ ] appears in the original patent but forms no part of this reissue; matter printed in italics indicates the additions made by reissue.

*(Amended)*

(56) References Cited

U.S. PATENT DOCUMENTS

| | | | | | |
|---|---|---|---|---|---|
| D896,809 | S | * | 9/2020 | Cai | D14/392 |
| D897,352 | S | * | 9/2020 | Akana | D14/455 |
| D902,928 | S | * | 11/2020 | Cai | D14/392 |
| D909,375 | S | * | 2/2021 | Chan | D14/392 |
| D910,629 | S | * | 2/2021 | Chan | D14/392 |
| D911,336 | S | * | 2/2021 | Chan | D14/392 |
| D912,066 | S | * | 3/2021 | Zhu | D14/455 |
| D934,249 | S | * | 10/2021 | O'Gnimh | D14/392 |
| D940,138 | S | * | 1/2022 | Oljaca | D14/392 |
| D976,260 | S | * | 1/2023 | Ehrenberg | D14/392 |
| D983,199 | S | * | 4/2023 | Guo | D14/392 |
| D1,006,017 | S | * | 11/2023 | Li | D14/392 |
| 2019/0212784 | A1 | * | 7/2019 | Oakeson | G06F 1/1669 |

FOREIGN PATENT DOCUMENTS

| | | | |
|---|---|---|---|
| CN | 307491214 | * | 8/2022 |
| CN | 307505148 | * | 8/2022 |
| CN | 307521697 | * | 8/2022 |

OTHER PUBLICATIONS

Felicon, "Wireless Bluetooth Keyboard", available at amazon.com, date first available Dec. 17, 2019, site visited Sep. 20, 2022, Available at URL: https://a.co/d/gjsv8CN (Year: 2019).*

Ubotie "Colorful Bluetooth 100 Keys Keyboard . . . " available at amazon.com, date first available Jun. 3, 2021, site visited Sep. 20, 2022, Available at URL: https://a.co/d/9XSb2rj (Year: 2021).*

Nacodex, "308I Wireless Bluetooth Keyboard Typewriter . . . " available at amazon.com, date first available Dec. 11, 2019, site visited Sep. 20, 2022, Available at URL: https://a.co/d/4bfecnc (Year: 2019).*

Tishled, "Typewriter Keyboard . . . ", available at amazon.com, date first available Feb. 23, 2020, site visited Sep. 20, 2022, Available at URL: https://a.co/d/1IXkAKQ (Year: 2020).*

Moffi, "Wireless Bluetooth Keyboard . . . ", available at amazon.com, date first available Jan. 18, 2021, site visited Sep. 21, 2022, Available at URL: https://a.co/d/dqantuR (Year: 2021).*

* cited by examiner

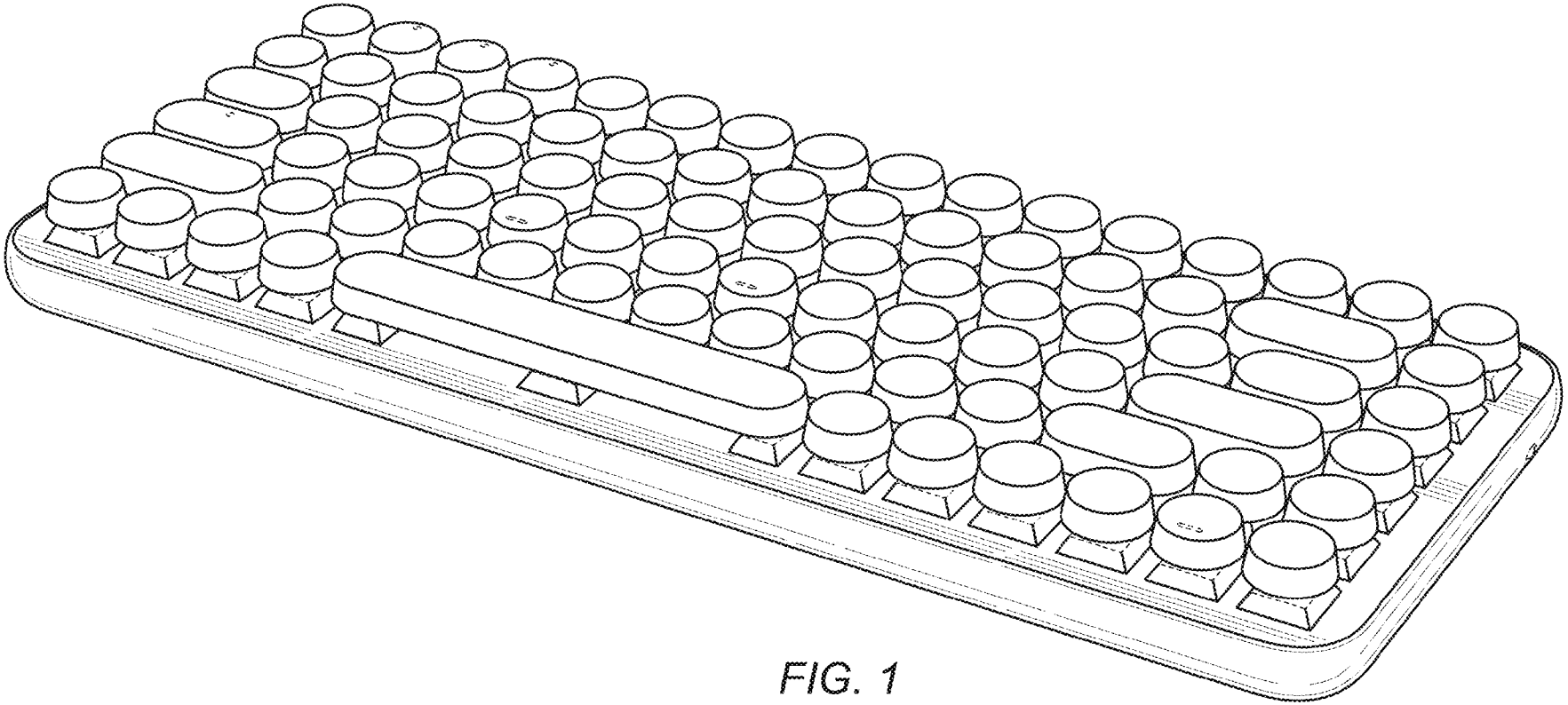
FIG. 1
(Amended)

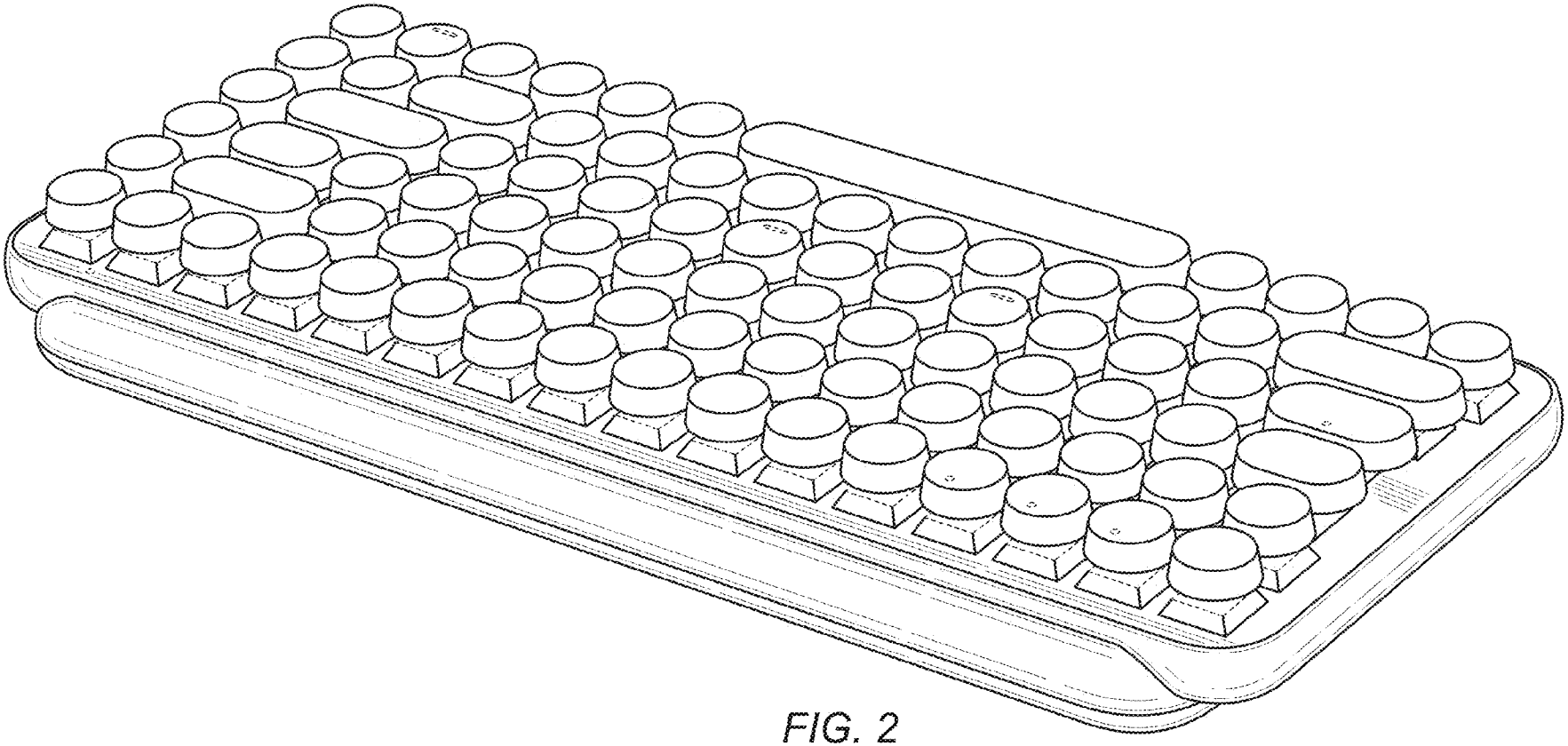
FIG. 2
(Amended)

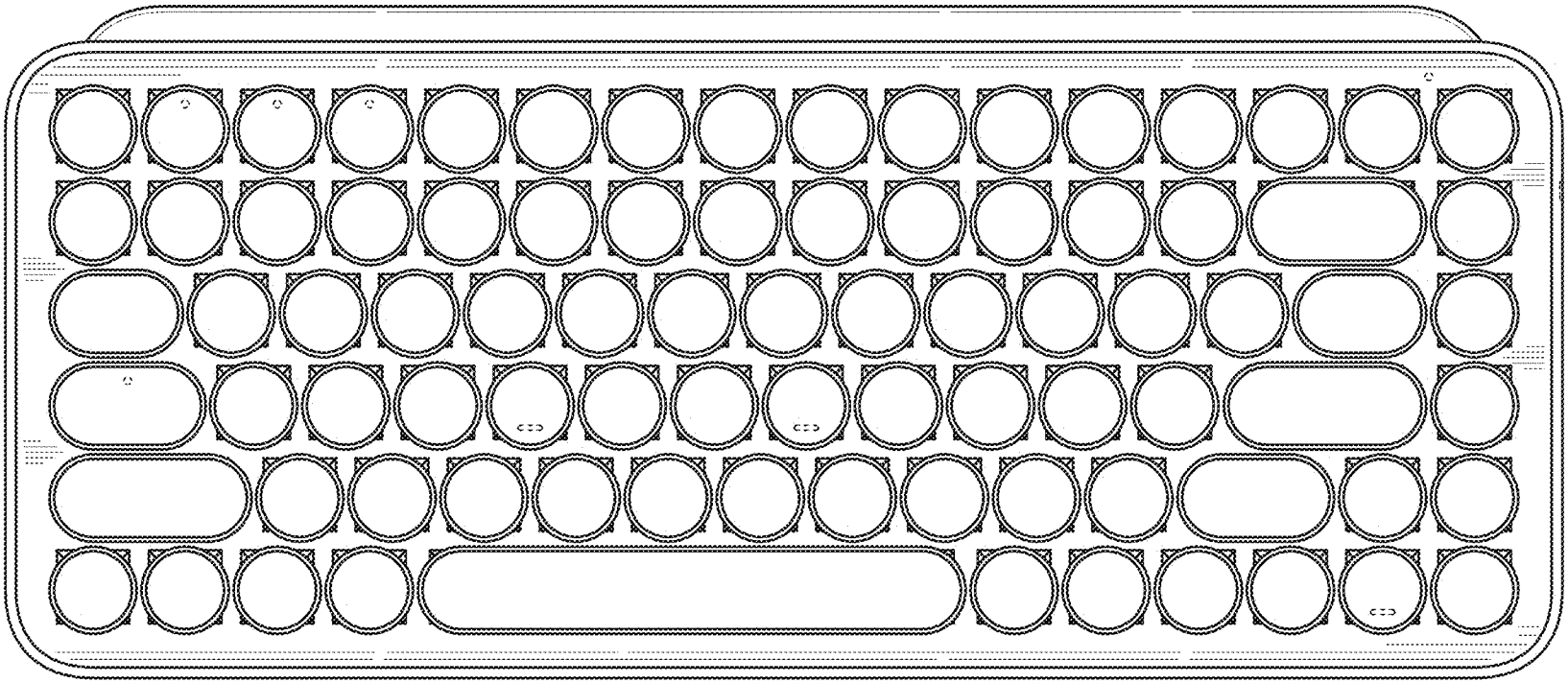
FIG. 3
(Amended)

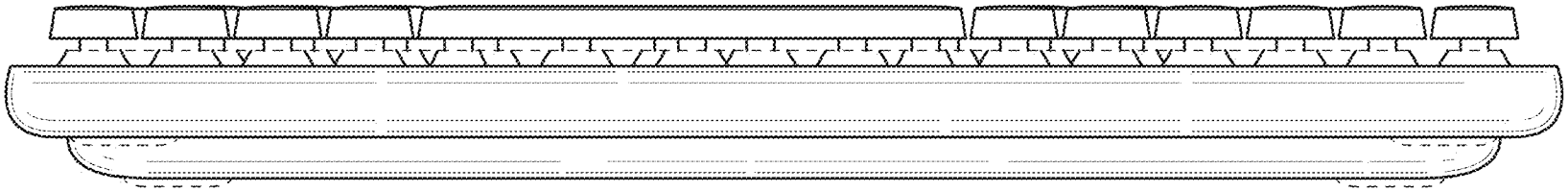
FIG. 5 (Amended)
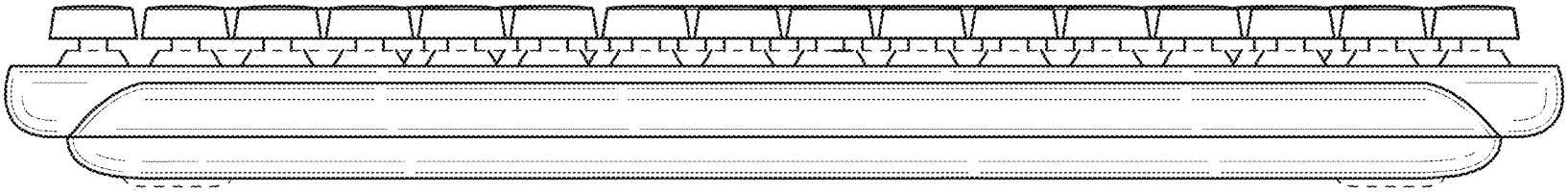
FIG. 6 (Amended)
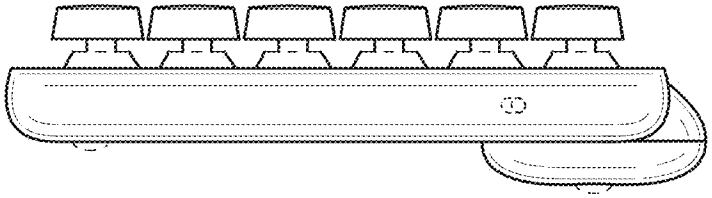
FIG. 8 (Amended)
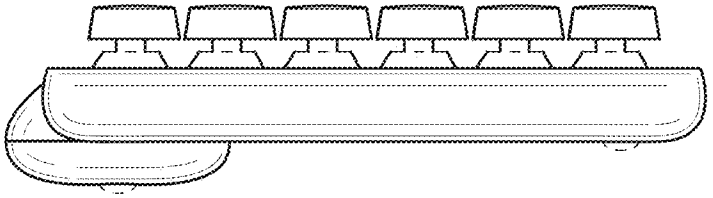
FIG. 7 (Amended)